Patented Aug. 23, 1932

1,872,923

UNITED STATES PATENT OFFICE

ROBERT R. FULTON, OF PITTSBURGH, PENNSYLVANIA, ASSIGNOR TO THE KOPPERS COMPANY OF DELAWARE, A CORPORATION OF DELAWARE

PROCESS OF PREPARING HYDROCYANIC ACID

No Drawing.  Application filed June 28, 1929. Serial No. 374,613.

This invention relates to an improved process of preparing hydrocyanic acid from ammonia and hydrocarbons.

An object of the present invention is to provide an efficient method of preparing hydrocyanic acid at a reduced cost and with increased yields.

Another object is to provide a catalyst which is particularly adapted to the process of the present invention.

In accordance with the present process, ammonia gas and hydrocarbon vapors are thoroughly mixed together in such manner that a mixture is formed containing these substances in the proportions which take part in the complete reaction between them, when forming hydrocyanic acid, and this mixture is passed into the reaction chamber over a very effective catalyst.

It is of fundamental importance that the reacting substances should be properly mixed before they are subjected to heat and passed over the contact mass. Only when the substances are mixed in correct molecular proportions can the maximum yields be obtained with minimum amounts of objectionable by-products.

An important feature of the present invention is the manner in which the ammonia and hydrocarbon are mixed. This is brought about by bubbling ammonia gas, preferably anhydrous, through a hydrocarbon, which is liquid at ordinary temperatures, such as benzene or toluene, under such conditions that the resultant gas mixture contains the desired proportions by volume.

By way of example, anhydrous ammonia gas is bubbled through benzene contained in a suitable absorption apparatus and the benzene kept at a temperature preferably between 28° and 30° C. at atmospheric pressure. At about 28° C., the vapor tension of benzene is such that the resultant gas mixture contains one volume of benzene and six volumes of ammonia.

The ammonia-benzene mixture is led over a catalyst heated preferably to 1100° to 1150° C. The hydrocyanic acid formed is absorbed in sodium hydroxide to form sodium cyanide, or in a mixture of milk of lime and sulphur to form calcium thiocyanate.

The reactions involved are:—

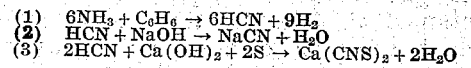

When, for instance, toluene is used, it is heated to from 50° C. to 55° C. and preferably kept within this temperature range at atmospheric pressure while passing ammonia through it to obtain a mixture of proper proportions, namely, one volume of toluene to seven volumes of ammonia. The mixture is then permitted to react in the presence of a catalyst and the process carried on as set forth above in the case of benzene. The following reaction between toluene and ammonia occurs:—

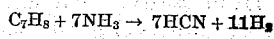

Various catalysts including a mixture of granular alumina and granular fused quartz, or pumice coated with alumina, or coke, etc., may be used. However, the best results are obtained by the use of a catalyst prepared in the following manner:—A soluble aluminum salt such as aluminum nitrate is dissolved in water to form a dilute solution, and any desired amount of a microporous silicious mineral powder as for instance tripoli or diatomaceous earth is stirred into the solution. Thereafter aluminum hydroxide is precipitated by the addition of ammonium carbonate in sufficient amount to entirely precipitate the aluminum as aluminum hydroxide. Ammonium hydroxide may be used instead of ammonium carbonate, or any other compound may be used which when heated with freshly precipitated aluminum hydroxide, will pass off and at the same time tend to form pores in the latter. The precipitate is filtered without washing and dried slowly at a low temperature and ignited rapidly at a temperature up to about 400° C.

The resulting substance is in the form of granules having a macro- and microporous structure. On heating this material in the presence of ammonia and benzene, aluminum nitride is formed having the same physical structure and it is apparently this compound which has the desired catalytic effect.

The presence upon the above catalyst of carbon deposited from the benzene vapor further increases the activity of the catalyst.

In place of pure benzene, a commercial benzol containing impurities such as xylene, toluene, pyridine and tarry matter may be used. In fact any substantially pure liquid hydrocarbon may be used and after the proper temperature is determined at which the desired proportions of amomnia and hydrocarbon may be obtained in the manner set forth, the reaction will proceed rapidly and efficiently.

I claim as my invention:

1. In a process of manufacturing hydrocyanic acid from a hydrocarbon and ammonia, the step consisting of bubbling ammonia gas through a liquid hydrocarbon maintained at a temperature and pressure at which a mixture of ammonia and hydrocarbon vapor is formed in the proportions which react completely to form hydrocyanic acid.

2. In a process of manufacturing hydrocyanic acid from a hydrocarbon and ammonia, the step consisting of passing ammonia gas through liquid benzene maintained at substantially 28° C. to 30° C. at atmospheric pressure to form a mixture of ammonia and benzene vapor in the proportions which react completely to form hydrocyanic acid.

3. In a process of manufacturing hydrocyanic acid from a hydrocarbon and ammonia, the step consisting of passing ammonia gas through liquid toluene maintained at substantially 50° C. to 55° C. at atmospheric pressure to form a mixture of ammonia and toluene vapor in the proportions which react completely to form hydrocyanic acid.

In testimony whereof, I have hereunto subscribed my name this 21st day of June, 1929.

ROBERT R. FULTON.